United States Patent
Shiraki et al.

(10) Patent No.: US 9,580,007 B2
(45) Date of Patent: Feb. 28, 2017

(54) PROJECTION SYSTEM AND COMPUTER-READABLE STORAGE MEDIUM

(71) Applicant: TOYOTA JIDOSHA KABUSHIKI KAISHA, Toyota-shi, Aichi-ken (JP)

(72) Inventors: Nobuyuki Shiraki, Nagakute (JP); Shigeyoshi Hiratsuka, Nagakute (JP); Shinichi Kojima, Nagakute (JP); Kazuya Asaoka, Seto (JP); Kazuhiko Nakashima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/009,129

(22) Filed: Jan. 28, 2016

(65) Prior Publication Data
US 2016/0229333 A1   Aug. 11, 2016

(30) Foreign Application Priority Data
Feb. 10, 2015   (JP) .................................. 2015-024403

(51) Int. Cl.
| | | |
|---|---|---|
| *B60Q 1/00* | (2006.01) | |
| *B60Q 1/26* | (2006.01) | |
| *B60Q 1/08* | (2006.01) | |
| *B60Q 1/52* | (2006.01) | |
| *B60Q 9/00* | (2006.01) | |

(52) U.S. Cl.
CPC ................ *B60Q 1/26* (2013.01); *B60Q 1/08* (2013.01); *B60Q 1/085* (2013.01); *B60Q 1/525* (2013.01); *B60Q 9/008* (2013.01); *B60Q 2300/112* (2013.01); *B60Q 2300/45* (2013.01); *B60Q 2400/50* (2013.01)

(58) Field of Classification Search
CPC . B60Q 1/26; B60Q 1/08; B60Q 1/085; B60Q 1/16
USPC ..... 340/425.5, 435, 436, 468; 382/103, 104; 701/301; 362/36, 37
See application file for complete search history.

(56) References Cited

U.S. PATENT DOCUMENTS

2012/0287493 A1*  11/2012  Kuhlman ............... B60Q 1/085
                                                                       359/228

FOREIGN PATENT DOCUMENTS

| JP | 2008-299779 A | 12/2008 |
|---|---|---|
| JP | 2009-220631 A | 10/2009 |

* cited by examiner

*Primary Examiner* — Toan N Pham
(74) *Attorney, Agent, or Firm* — Oliff PLC

(57) ABSTRACT

A projection system includes: a position detecting section that detects the position of a target object located in front of a host vehicle; and a control section which, on the basis of the position of the target object detected by the position detecting section, controls a headlamp so as to project onto the position of the target object a projection pattern that moves in a direction corresponding to the direction of motion of a background at the position of the target object or a direction corresponding to the opposite direction of the direction of motion of the background.

9 Claims, 15 Drawing Sheets

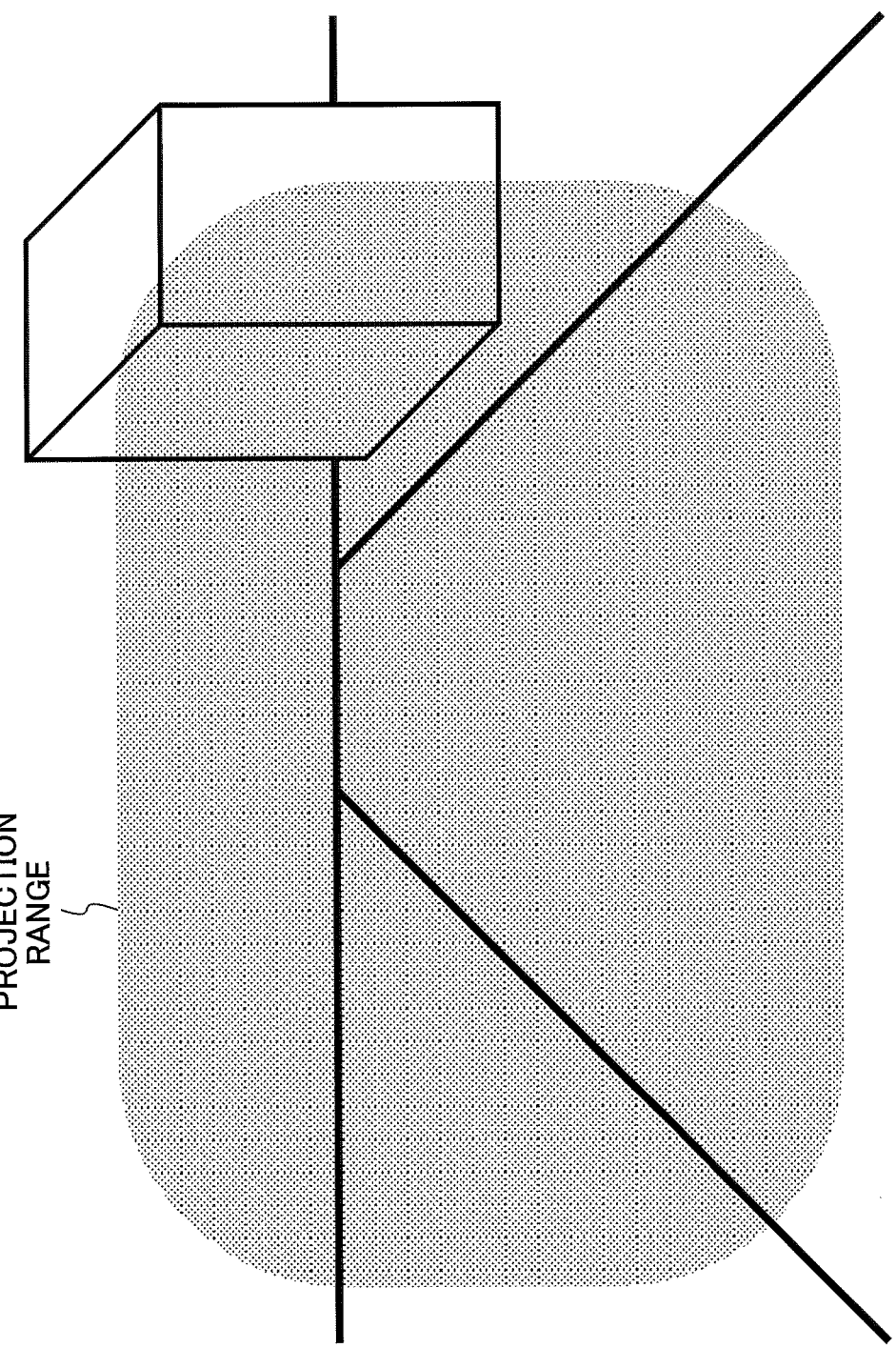

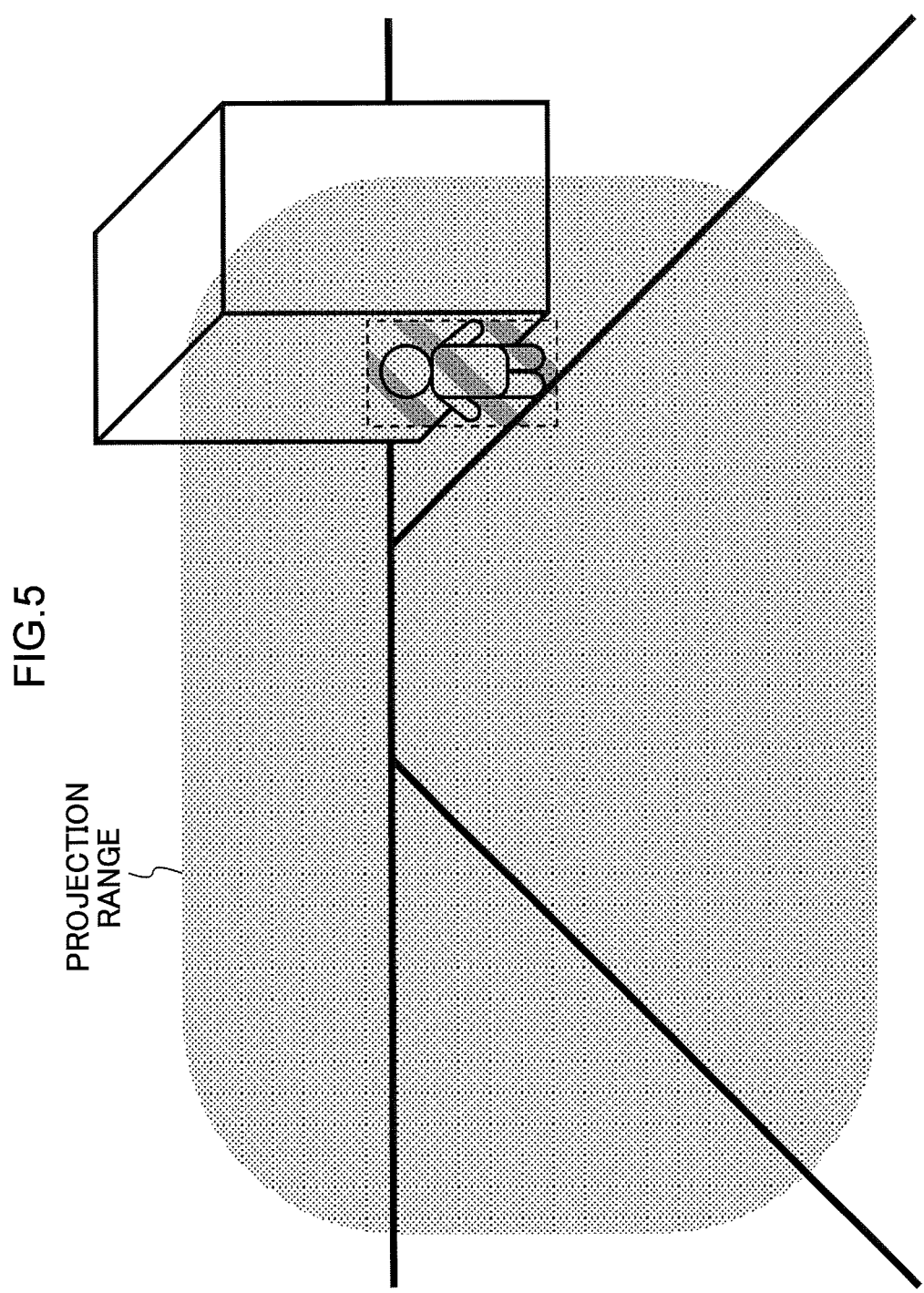

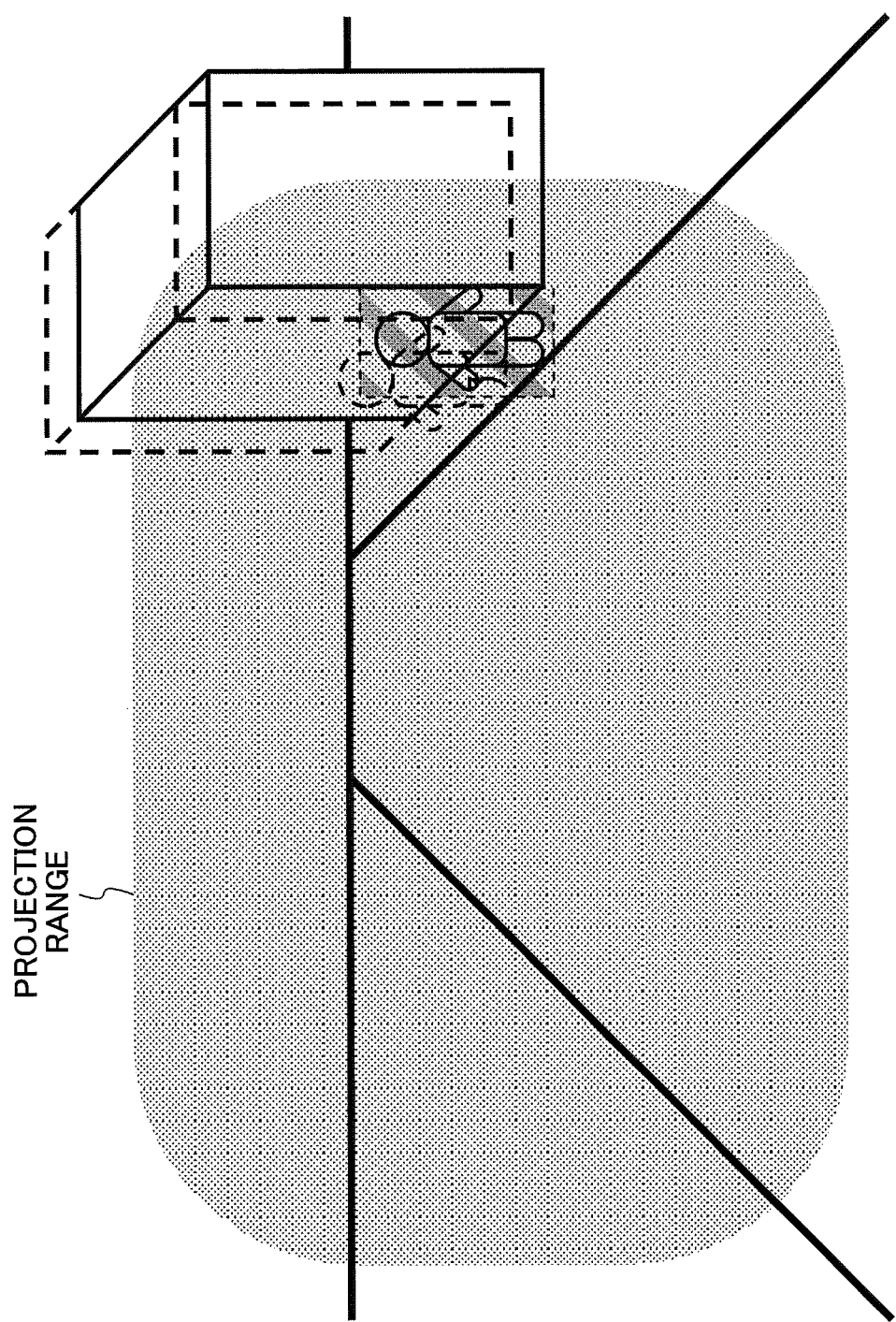

FIG.7

HOW PEDESTRIAN LOCATED ON RIGHT SIDE OF ROAD APPEARS

| SPEED OF MOTION OF BACKGROUND | WAY IN WHICH DESIGN MOVES | MOTION APPEARING TO PERSON |
|---|---|---|
| MOTIONLESS | MOTIONLESS | NONE |
|  | LOWER RIGHT | MOVING AWAY |
|  | UPPER LEFT | MOVING CLOSER |
|  | LEFT | JUMPING OUT |
| SLOW | MOTIONLESS | NONE |
|  | LOWER RIGHT | MOTIONLESS OR MOVING AWAY |
|  | UPPER LEFT | QUICKLY MOVING CLOSER |
|  | LEFT | JUMPING OUT |
| FAST | MOTIONLESS | NONE |
|  | LOWER RIGHT | MOTIONLESS OR SLOWLY MOVING AWAY |
|  | UPPER LEFT | QUITE QUICKLY MOVING CLOSER |
|  | LEFT | JUMPING OUT |

FIG.9

HOW PEDESTRIAN LOCATED ON LEFT SIDE OF ROAD APPEARS

| SPEED OF MOTION OF BACKGROUND | WAY IN WHICH DESIGN MOVES | MOTION APPEARING TO PERSON |
|---|---|---|
| MOTIONLESS | MOTIONLESS | NONE |
|  | LOWER LEFT | MOVING AWAY |
|  | UPPER RIGHT | MOVING CLOSER |
|  | RIGHT | JUMPING OUT |
| SLOW | MOTIONLESS | NONE |
|  | LOWER LEFT | MOTIONLESS OR MOVING AWAY |
|  | UPPER RIGHT | QUICKLY MOVING CLOSER |
|  | RIGHT | JUMPING OUT |
| FAST | MOTIONLESS | NONE |
|  | LOWER LEFT | MOTIONLESS OR SLOWLY MOVING AWAY |
|  | UPPER RIGHT | QUITE QUICKLY MOVING CLOSER |
|  | RIGHT | JUMPING OUT |

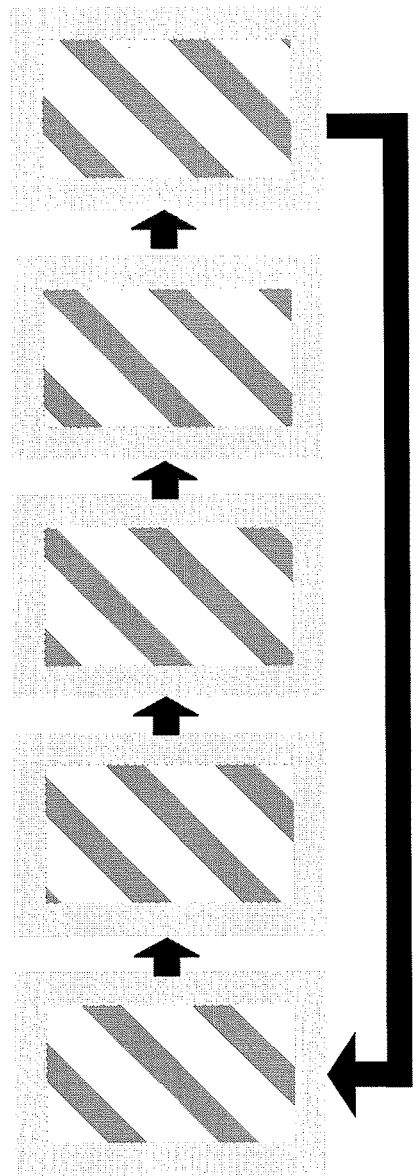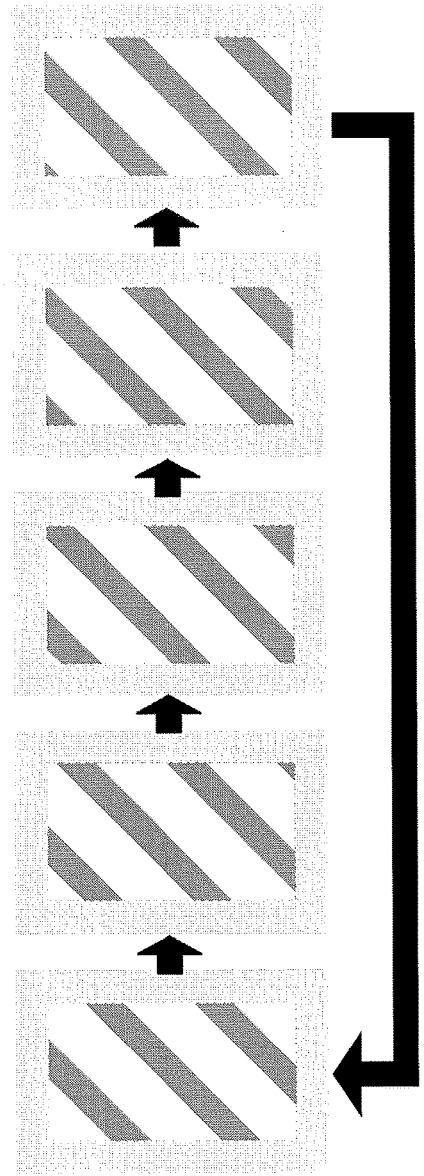

PROJECTION SYSTEM AND COMPUTER-READABLE STORAGE MEDIUM

CROSS-REFERENCE TO RELATED APPLICATION

This application is based on and claims priority under 35 USC 119 from Japanese Patent Application No. 2015-024403 filed on Feb. 10, 2015, which is incorporated by reference herein.

BACKGROUND

Technical Field

The present invention pertains to a projection system and a computer-readable storage medium and particularly to a projection system and a computer-readable storage medium that control a headlamp.

Related Art

Conventionally, a vehicle headlamp device has been known which can easily control the projection of light in the direction of a road shoulder in such a way that it can alert at least one of a driver and a pedestrian (e.g., Japanese Patent Application Laid-open (JP-A) No. 2009-220631).

Furthermore, a moving body approach notification system has been known which can, with a simple and easy configuration and such that is easy for a driver to understand in a sensory way, give notification of the presence of a moving body that is, approaching and difficult to notice (JP-A No. 2008-299779).

The technology of JP-A No. 2009-220631 has the problems that it is necessary to add a separate lamp in order to alert the driver and/or the pedestrian, the cost of the device increases, and the volume needed to install the device in a vehicle increases. Furthermore, sometimes, in cases where the driver is driving absentmindedly, the driver fails to notice the pedestrian just by having the headlights projected onto the pedestrian.

Furthermore, the technology of JP-A No. 2008-299779 has the problem that, although it uses a cabin lamp to notify the driver that a moving body is approaching, the lighting-up of the cabin lamp is difficult for a driver whose gaze is fixed in the forward direction to notice.

SUMMARY

The present invention has been made in view of the circumstances described above, and it is an object thereof to provide a projection system that can alert the driver of a vehicle.

In order to achieve the object described above, a projection system of the present invention is configured to include: position detecting section that detects the position of a target object located in front of a host vehicle; and control section which, on the basis of the position of the target object detected by the position detecting section, controls a headlamp so as to project onto the position of the target object a projection pattern that moves in a direction corresponding to the direction of motion of a background at the position of the target object or a direction corresponding to the opposite direction of the direction of motion of the background.

Furthermore, a computer-readable storage medium of the present invention stores a program for causing a computer to detect the position of a target object located in front of a host vehicle; and on the basis of the position of the detected target object, controls a headlamp so as to project onto the position of the target object a projection pattern that moves in a direction corresponding to the direction of motion of a background at the position of the target object or a direction corresponding to the opposite direction of the direction of motion of the background.

In the projection system of the present invention, the position detecting section detects the position of the target object located in front of the host vehicle. Additionally, on the basis of the position of the target object detected by the position detecting section, the control section controls the headlamp so as to project onto the position of the target object the projection pattern that moves in a direction corresponding to the direction of motion of the background at the position of the target object or a direction corresponding to the opposite direction of the direction of motion of the background.

In this way, by controlling the headlamp so as to project onto the position of the target object the projection pattern that moves in a direction corresponding to the direction of motion of the background at the position of the target object or a direction corresponding to the opposite direction of the direction of motion of the background, the driver of the vehicle can be alerted.

Furthermore, the projection pattern may be a projection pattern in which a predetermined design moves.

Furthermore, the predetermined design may be a design predetermined in accordance with the direction of motion of the background.

Furthermore, in a case where the position of the target object detected by the position detecting section is on the right side of the road, the control section may control the headlamp so as to project onto the position of the target object the projection pattern which moves in a lower right direction or an upper left direction, and in a case where the position of the target object detected by the position detecting section is on the left side of the road, the control section may control the headlamp so as to project onto the position of the target object the projection pattern which moves in a lower left direction or an upper right direction.

Furthermore, the control section may control the headlamp so as to change the position of the projection pattern and project the projection pattern in correspondence to a change in the relative position of the target object on the basis of the position of the target object detected by the position detecting section and the velocity of the host vehicle.

Furthermore, the position detecting section may further detect the position of a background object located in the background of the target object, and the control section may calculate the relative motion of the background object on the basis of the position of the background object detected by the position detecting section and the velocity of the host vehicle and change the position of the projection pattern and project the projection pattern in correspondence to the change in the relative position of the target object on the basis of the position of the target object detected by the position detecting section and the relative motion of the background object that has been calculated.

Furthermore, the control section may calculate the relative motion of the target object on the basis of a time series of the position of the target object detected by the position detecting section and change the position of the projection pattern and project the projection pattern in correspondence to the change in the relative position of the target object on the basis of the position of the target object detected by the position detecting section and the relative motion of the target object that has been calculated.

Furthermore, the target object may be a pedestrian.

As described above, according to the projection system and the computer-readable storage medium of the present invention, there is obtained the effect that, by controlling the headlamp so as to project onto the position of the target object the projection pattern that moves in a direction corresponding to the direction of motion of the background at the position of the target object or a direction corresponding to the opposite direction of the direction of motion of the background, the driver of the vehicle can be alerted.

BRIEF DESCRIPTION OF THE DRAWINGS

FIG. 4 is a drawing for describing a projection range in which light is projected by a headlamp light-projecting device 26;

FIG. 5 is a drawing showing an example in which a moving projection pattern is projected onto a pedestrian;

FIG. 6 is a drawing showing an example in which the moving projection pattern is projected onto the pedestrian;

FIG. 7 is a drawing for describing how a pedestrian located on the right side of a road appears when the moving projection pattern is projected onto the pedestrian;

FIG. 9 is a drawing for describing how a pedestrian located on the left side of a road appears when the moving projection pattern is projected onto the pedestrian;

FIGS. 10A, B are drawings showing examples of the moving projection pattern;

DETAILED DESCRIPTION

<Gist>

When a vehicle is traveling, the background moves in a fixed direction. For example, objects on the right side as seen from the perspective of a host vehicle generally move to the lower right while objects on the left side move to the lower left. In the embodiments of the present invention, a projection system generates a design of a projection pattern that moves in accordance with the motion of the background, and the projection system projects the moving projection pattern onto people and barriers. The projection of the moving projection pattern onto people and barriers produces a synergistic effect between the motion of the background and the motion of the design of the projection pattern.

Figure 1:
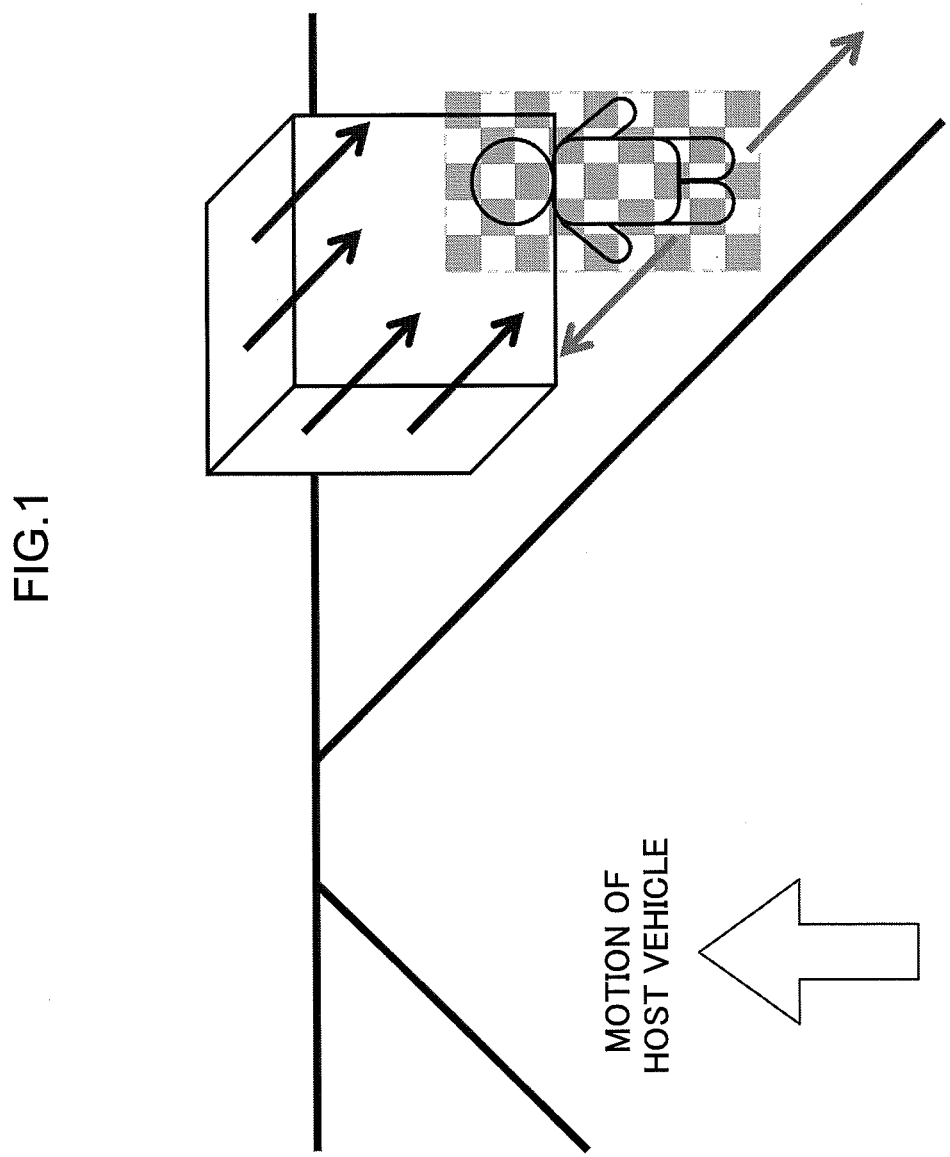
FIG. 1 is a drawing for describing the gist of embodiments of the present invention.

FIG. 1 is a drawing showing an example of the relationship between the motion of the host vehicle and the motion of the background. As shown in FIG. 1, when the host vehicle is traveling, objects (e.g., buildings and so forth) on the right side in the background as seen from the perspective of the host vehicle move to the lower right while objects (e.g., buildings and so forth) on the left side in the background move to the lower left. When, for example, a design moving toward the lower right is projected onto an object on the right side as seen from the perspective of the host vehicle as that object is moving to the lower right, the part onto which the design is projected appears to be stationary or appears to be moving slowly. Conversely, when a design moving toward the upper left is projected onto the object, the object appears to be moving while undergoing acceleration. When this kind of projection is performed, changes in the motion of the part onto which the design is projected become more conspicuous, and so a person can be made more aware of those changes. As a result, this contributes to preventing accidents and improving safety.

In the embodiments of the present invention, a headlamp device that can project an arbitrary pattern is used. Furthermore, it is to be excepted that sometimes the driver will not notice people and/or barriers when the low beams are used, but sometimes the driver also fails to notice (does not notice) people and/or barriers even when the high beams are used. For this reason, in the embodiments of the present invention, headlight projection is performed using a specific projection pattern. Furthermore, the specific projection pattern is a pattern that triggers a person's awareness, and its characteristic is that it has a specific way of moving relative to the motion of the background.

The embodiments of the present invention will be described in detail below with reference to the drawings.

First Embodiment

Configuration of Projection System 10

Figure 2:
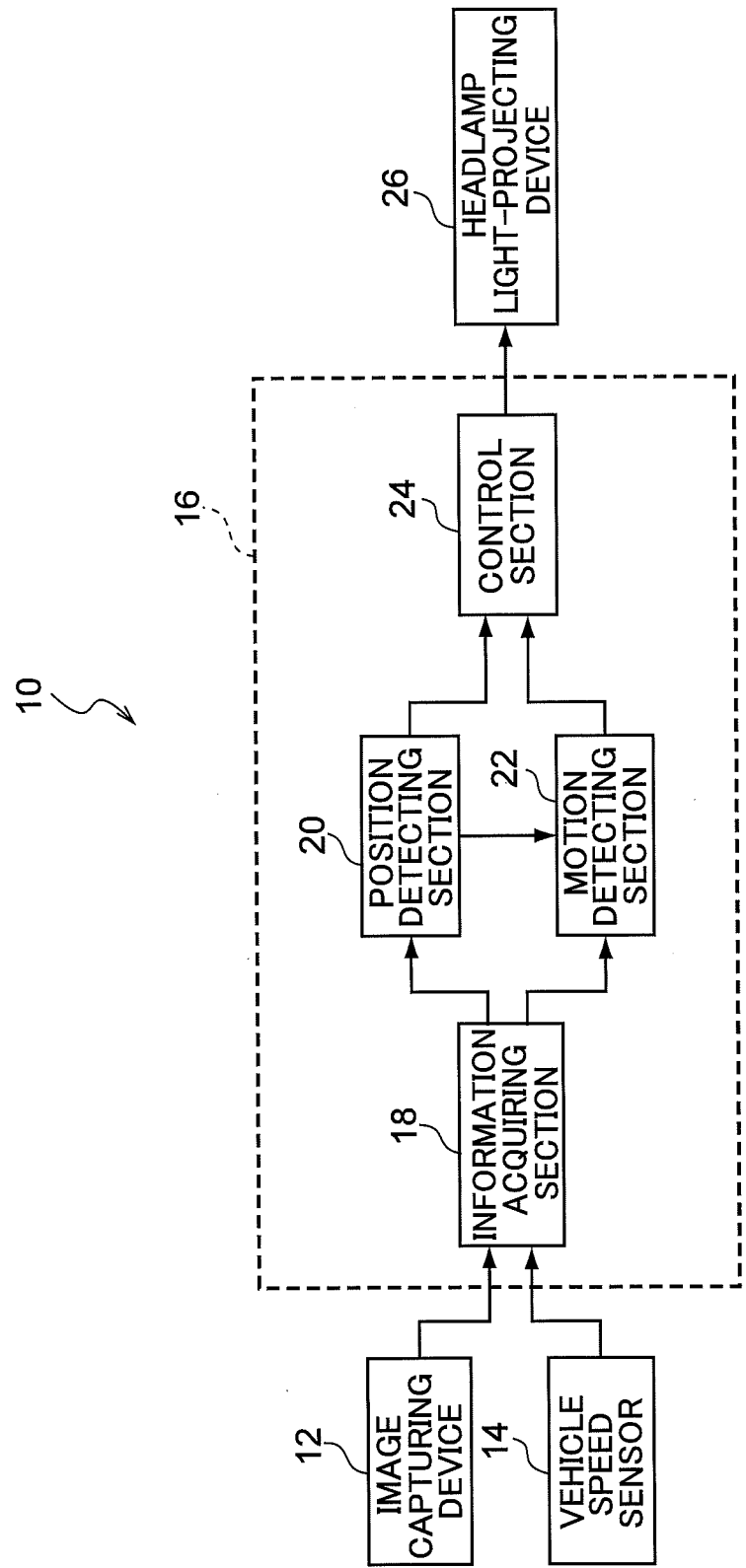
FIG. 2 is a block diagram of a projection system of the embodiments of the present invention.

As shown in FIG. 2, a projection system 10 pertaining to a first embodiment of the present invention is equipped with an image capturing device 12 that captures an image of the area in the forward direction of a host vehicle, a vehicle speed sensor 14 that sequentially detects the velocity of the host vehicle, a computer 16 that controls a headlamp light-projecting device 26 on the basis of the forward image captured by the image capturing device 12 and the vehicle speed detesectioncted by the vehicle speed sensor 14, and the headlamp light-projecting device 26, which projects light in the forward direction of the host vehicle. The projection system 10 is installed in a vehicle (not shown in the drawings).

The image capturing device 12 is equipped with an image capturing section (not shown in the drawings) configured by a monocular camera that captures a forward image looking in the forward direction of the host vehicle and generates image signals of the image, an analog-to-digital conversion section (not shown in the drawings) that converts from analog to digital the image signals generated by the image capturing component, and an image memory (not shown in the drawings) for temporarily storing the image signals that have been converted from analog to digital.

The computer 16 is equipped with a CPU, a RAM, and a ROM that stores a program for executing a projection process routine described later. Functionally the computer 16 is configured as follows. As shown in FIG. 2, the computer 16 is equipped with an information acquiring section 18 that sequentially acquires the forward image captured by the image capturing device 12 and the vehicle speed detected by the vehicle speed sensor 14, a position detecting section 20 that detects the positions of a pedestrian and a background object on the basis of the forward image acquired by the information acquiring section 18, a motion detecting section 22 that calculates the speed of relative motion of the background object on the basis of the position of the background object detected by the position detecting section 20, and a control section 24 that controls the headlamp light-projecting device 26 on the basis of the position of the pedestrian detected by the position detecting section 20 and the speed of relative motion of the background object calculated by the motion detecting section 22. The motion detecting section 22 and the control section 24 are an example of control section.

The information acquiring section 18 acquires the forward image captured by the image capturing device 12 and the vehicle speed detected by the vehicle speed sensor 14.

The position detecting section 20 detects the positions of a pedestrian located in front of the host vehicle and a background object located in the background of the pedestrian on the basis of the forward image acquired by the information acquiring section 18. For example, the position detecting section 20 detects the position of the pedestrian and the position of the background object using a pattern recognition technique. In the present embodiment, a case where the target object to be detected is a pedestrian is taken as an example and described, but the target object to be detected is not limited to this and may also be a barrier.

Figure 3:
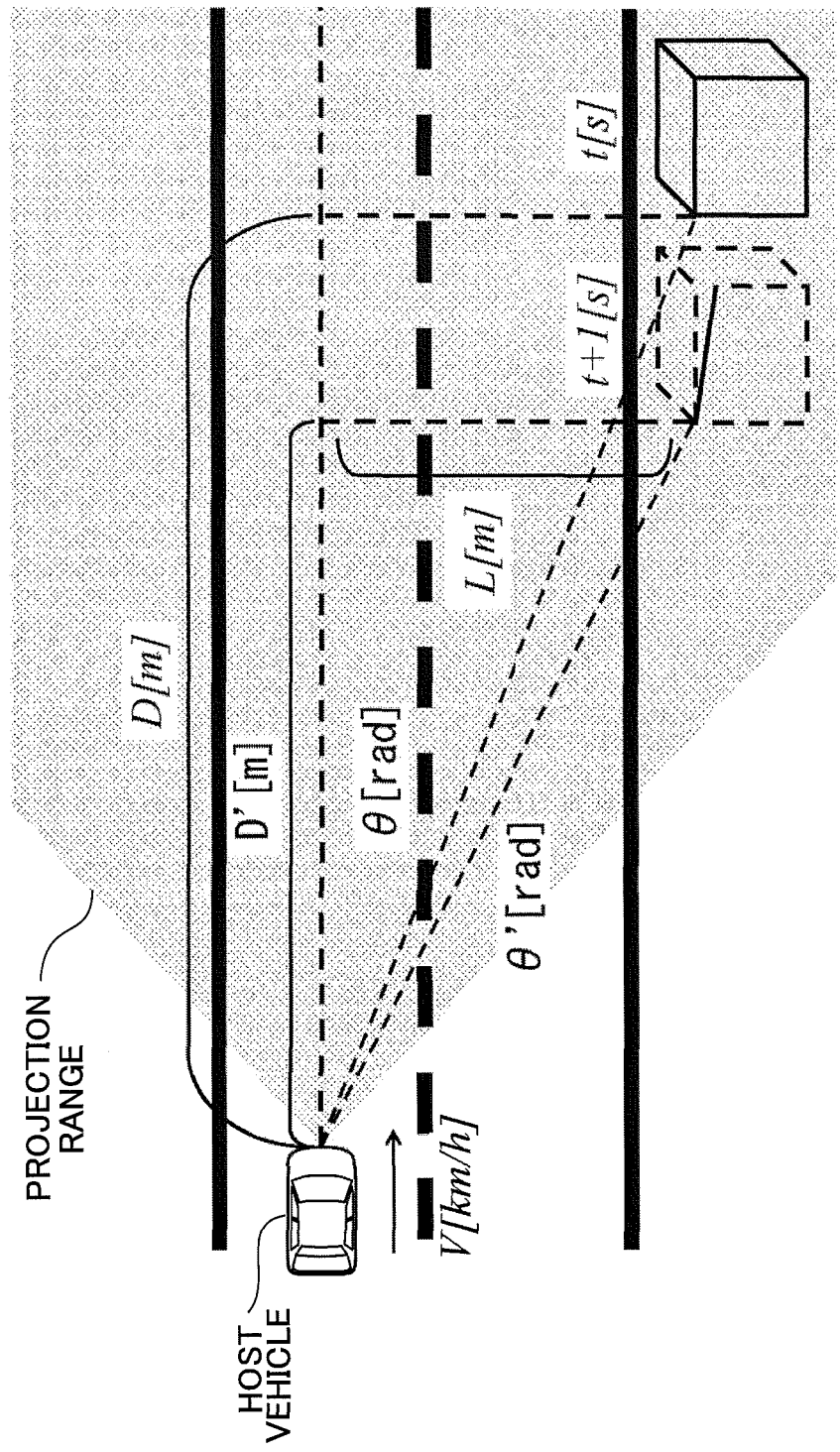
FIG. 3 is a drawing for describing the speed of motion of a background object.

The motion detecting section 22 detects the relative motion of the background object on the basis of the vehicle speed acquired by the information acquiring section 18 and the position of the background object detected by the position detecting section 20. FIG. 3 shows an example of the method by which the motion detecting section 22 detects the relative motion of the background object.

As shown in FIG. 3, the motion detecting section 22 calculates a distance D between the host vehicle and the background object at time t and a lateral position L of the background object at time t on the basis of the position of the background object detected by the position detecting section 20. It should be noted that the lateral position L of the background object may also be calculated from the width of the road, at the position of the host vehicle, that is stored beforehand in a road network database and measured by a positioning device (not shown in the drawings). Then, the motion detecting section 22 calculates an angle θ seen from the perspective of the host vehicle at time t in accordance with equation (1) below on the basis of the distance D between the host vehicle and the background object at time t and the lateral position L of the background object.

$$\theta = \arctan\left(\frac{D}{L}\right) \quad \text{[Equation 1]}$$

Next, the motion detecting section 22 calculates a distance D' between the host vehicle and the background object at time t+1 in accordance with equation (2) below on the basis of a vehicle speed V acquired from the information acquiring section 18 and the distance D between the host vehicle and the background object at time t.

$$D' = D - \frac{V}{3.6} \quad \text{[Equation 2]}$$

Next, the motion detecting section 22 calculates an angle θ' seen from the perspective of the host vehicle at time t+1 in accordance with equation (3) below on the basis of the distance D' between the host vehicle and the background object at time t+1 and the lateral position L of the background object.

$$\theta' = \arctan\left(\frac{D'}{L}\right) = \arctan\left(\frac{D - \frac{V}{3.6}}{L}\right) \quad \text{[Equation 3]}$$

Then, the motion detecting section 22 calculates, in accordance with equation (4) below, the amount of angular change θ'-θ between the angle θ seen from the perspective of the host vehicle at time t and the angle θ' seen from the perspective of the host vehicle at time t+1. In the present embodiment, the amount of angular change seen from the perspective of the host vehicle serves as the speed of relative motion of the background object.

$$\theta' - \theta = \quad \text{[Equation 4]}$$
$$\arctan\left(\frac{D - \frac{V}{3.6}}{L}\right) - \arctan\left(\frac{D}{L}\right) = \arctan\left(\frac{\frac{VL}{3.6}}{L^2 + D^2 - \frac{VD}{3.6}}\right)$$

It should be noted that equation (4) is derived from relational equation (5) below.

$$\arctan\alpha - \arctan\beta = \arctan\left(\frac{\alpha - \beta}{1 + \alpha\beta}\right) \quad \text{[Equation 5]}$$

α and β in equation (5) represent arbitrary angles.

On the basis of the position of the pedestrian detected by the position detecting section 20 and the relative motion of the background object detected by the motion detecting section 22, the control section 24 controls the headlamp light-projecting device 26 so as to project onto the position of the pedestrian a projection pattern that moves in a direction corresponding to the direction of motion of the background at the position of the pedestrian or a direction corresponding to the opposite direction of the direction of motion of the background at the position of the pedestrian. The control section 24 also controls the headlamp light-projecting device 26 so as to change the position of the moving projection pattern and project the moving projection pattern in correspondence to the change in the relative position of the pedestrian. The moving projection pattern is set in such a way that a predetermined design moves in it.

FIG. 4 shows an example of a projection range in which light is projected by the headlamp light-projecting device 26 described later. In the present embodiment, as shown in FIG. 4, the headlamp light-projecting device 26 projects light in the forward direction of the host vehicle using a total projection pattern. Furthermore, FIG. 5 shows an example of the total projection pattern including the moving projection pattern. As shown in FIG. 5, the control section 24 controls the headlamp light-projecting device 26 so as to project the total projection pattern in which the moving projection pattern is placed so as to be projected onto the position of the pedestrian.

Furthermore, FIG. 6 shows an example of the total projection pattern at a subsequent time. As shown in FIG. 6, on the basis of the position of the pedestrian and the relative motion of the background object detected by the motion detecting section 22, the control section 24 controls the headlamp light-projecting device 26 so as to change the position of the moving projection pattern, and project the total projection pattern in which the moving projection pattern is placed, in correspondence to the change in the relative position of the pedestrian.

Furthermore, in a case where the position of the pedestrian detected by the position detecting section 20 is on the right side of the road, the control section 24 controls the headlamp light-projecting device 26 so as to project onto the position of the pedestrian the projection pattern which moves in the upper left direction. Furthermore, in a case where the position of the pedestrian detected by the position detecting section 20 is on the left side of the road, the control section 24 controls the headlamp light-projecting device 26 so as to project onto the position of the pedestrian the projection pattern which moves in an upper right direction.

It should be noted that, in a case where the position of the pedestrian detected by the position detecting section 20 is on the right side of the road, the control section 24 may also control the headlamp light-projecting device 26 so as to project onto the position of the pedestrian the projection pattern which moves in a lower right direction. Furthermore, in a case where the position of the pedestrian detected by the position detecting section 20 is on the left side of the road, the control section 24 may also control the headlamp light-projecting device 26 so as to project onto the position of the pedestrian the projection pattern which moves in a lower left direction.

FIG. 7 shows combinations of the speed of motion of the background, the way in which the design moves, and kinds of motion sensed by the driver of the host vehicle in a case where the pedestrian is located on the right side of the road. The background on the right side of the road moves in such a way as to flow to the lower right as seen from the perspective of the driver of the host vehicle. As shown in FIG. 7, in a case where the design moves in a direction (the lower right direction) corresponding to the direction of motion of the background relative to the motion of the background on the right side of the road, the pedestrian appears to move away from the driver. Furthermore, in a case where the design moves in a direction (the lower right direction) corresponding to the direction of motion of the background and the design moves at the same speed as the speed of motion of the background, the pedestrian appears motionless to the driver. Furthermore, in a case where the design moves in a direction (the upper left direction) corresponding to the opposite direction of the direction of motion of the background relative to the motion of the background on the right side of the road, the pedestrian appears to move closer to the driver. Furthermore, as an example of a direction corresponding to the opposite direction of the direction of motion of the background, in a case where the design moves in the left direction, the pedestrian appears to jump out.

Figure 8:
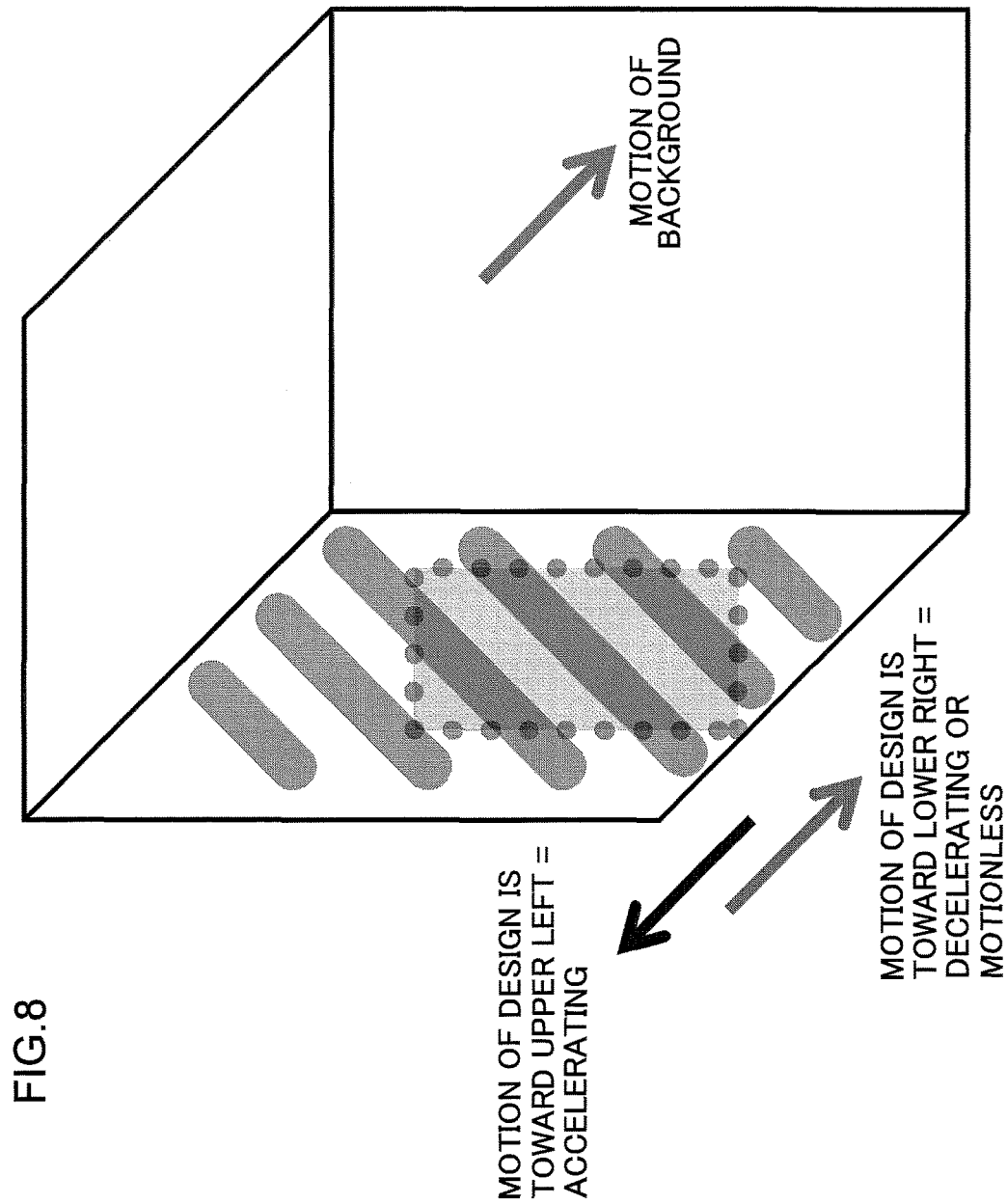
FIG. 8 is a drawing for describing how a target object onto which the moving projection pattern is projected appears.

FIG. 8 is a drawing for describing the direction of motion of the background and how things appear from the perspective of the driver. FIG. 8 shows a case where the direction of motion of the background is toward the lower right. As shown in FIG. 8, if one thinks of the design as being drawn on the background, let us suppose that the part of the background from which the design is cut out is projected onto the pedestrian as the moving projection pattern. In this case, how the design appears to the driver changes according to how the part of the background from which the design cut out moves relative to the background.

Furthermore, FIG. 9 shows combinations of the speed of motion of the background, the way in which the design moves, and kinds of motion sensed by the driver of the host vehicle in a case where the pedestrian is located on the left side of the road. The background on the left side of the road moves in such a way as to flow to the lower left as seen from the perspective of the driver of the host vehicle. As shown in FIG. 9, in a case where the design moves in a direction (the lower left direction) corresponding to the direction of motion of the background relative to the motion of the background on the left side of the road, the pedestrian appears to move away from the driver. Furthermore, in a case where the design moves in a direction (the lower left direction) corresponding to the direction of motion of the background and the design moves at the same speed as the speed of motion of the background, the pedestrian appears motionless to the driver. Furthermore, in a case where the design moves in a direction (the upper right direction) corresponding to the opposite direction of the direction of motion of the background relative to the motion of the background on the left side of the road, the pedestrian appears to move closer to the driver. Furthermore, as an example of a direction corresponding to the opposite direction of the direction of motion of the background, in a case where the design moves in the right direction, the pedestrian appears to jump out.

Furthermore, FIG. 10 to FIG. 12 show examples of the moving projection pattern that is projected onto the pedestrian. FIG. 10 shows examples of the pattern projected onto a pedestrian located on the right side of the road. The moving projection pattern shown in FIG. 10A represents a case where the predetermined design moves to the lower right. Furthermore, the moving projection pattern shown in FIG. 10B represents a case where the predetermined design moves to the upper left.

Figure 11A:
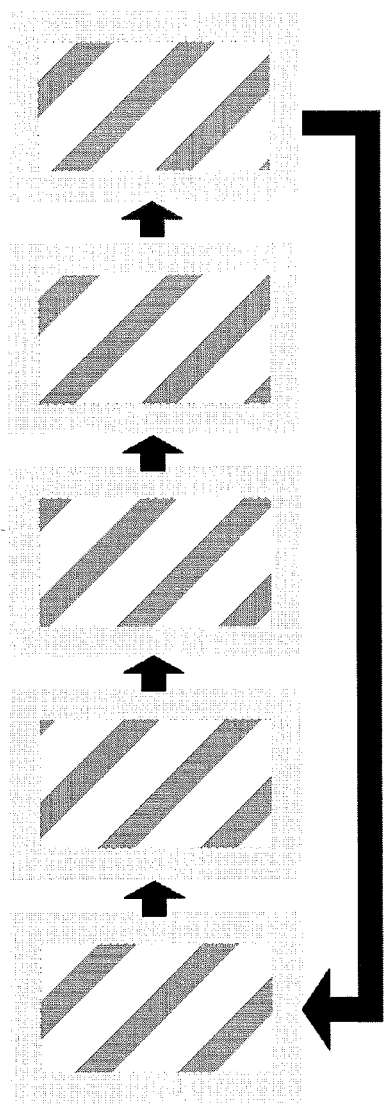
FIGS. 11A, B are drawings showing examples of the moving projection pattern.
Figure 11B:
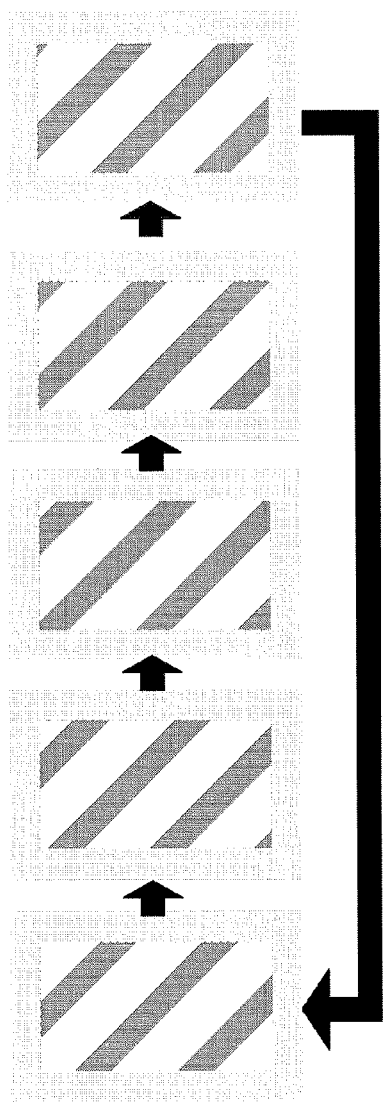

Furthermore, FIG. 11 shows examples of the pattern projected onto a pedestrian located on the left side of the road. The moving projection pattern shown in FIG. 11A represents a case where the predetermined design moves to the lower left. Furthermore, the moving projection pattern shown in FIG. 11B represents a case where the predetermined design moves to the upper right.

As shown in FIG. 10 and FIG. 11, the design of the moving projection pattern is predetermined in accordance with the direction of motion of the background.

For example, in a case where the position of the pedestrian detected by the position detecting section 20 is on the right side of the road, the control section 24 uses the headlamp light-projecting device 26 to project in the forward direction of the host vehicle the total projection pattern in which is placed the moving projection pattern with the design shown in FIG. 10. Furthermore, in a case where the position of the pedestrian detected by the position detecting section 20 is on the left side of the road, the control section 24 uses the headlamp light-projecting device 26 to project in the forward direction of the host vehicle the total projection pattern in which is placed the moving projection pattern with the design shown in FIG. 11.

Figure 12A:
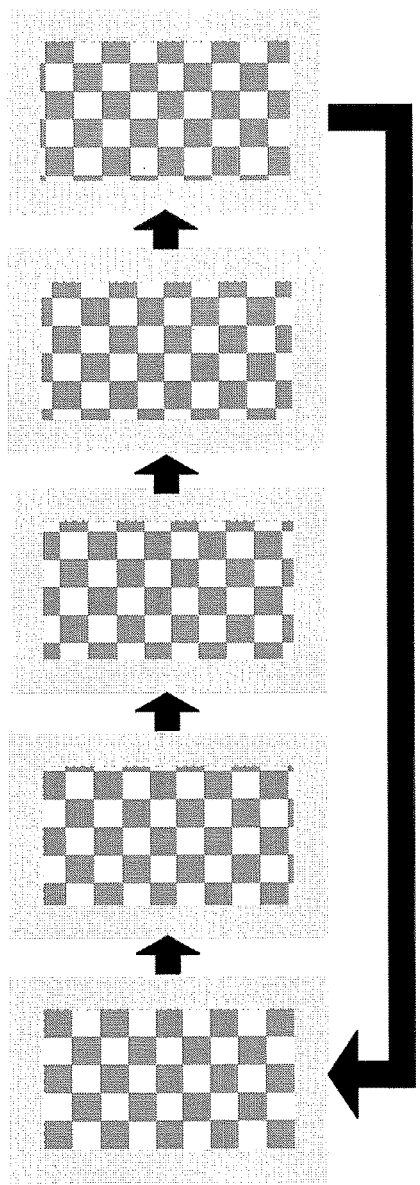
FIGS. 12A, B are drawings showing examples of the moving projection pattern.

It should be noted that the designs shown in FIG. 12 can also be set as the design of the moving projection pattern. FIGS. 12A and B show examples in a case where the design moves to the upper left. For example, in a case where the position of the pedestrian detected by the position detecting section 20 is on the right side of the road, the control section 24 uses the headlamp light-projecting device 26 to project in the forward direction of the host vehicle the total projection pattern in which is placed the moving projection pattern with the design shown in FIG. 12A or B.

Figure 12B:
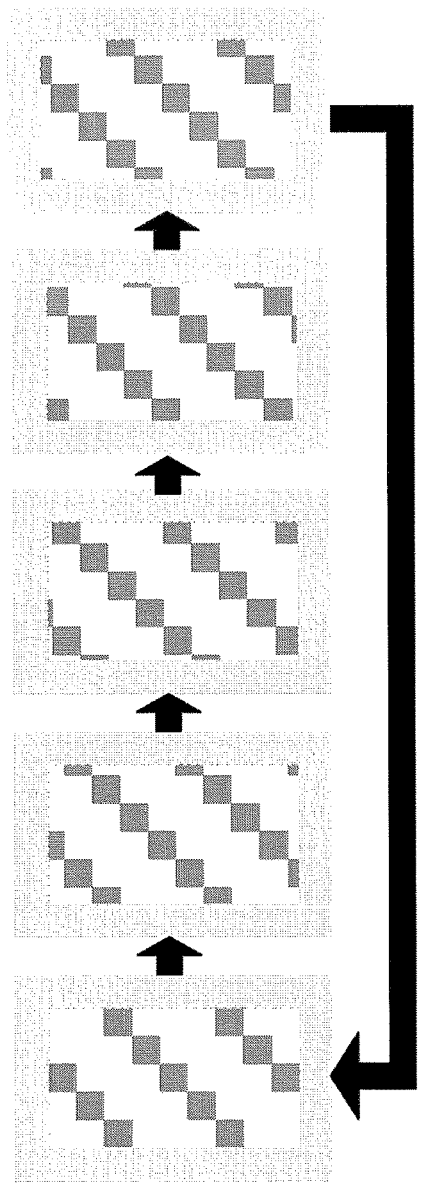

Furthermore, for example, in a case where the position of the pedestrian detected by the position detecting section 20 is on the left side of the road, the control section 24 uses the headlamp light-projecting device 26 to project in the forward direction of the host vehicle the total projection pattern in which is placed a projection pattern in which the design shown in FIG. 12A or a design bilaterally symmetrically inverted from the design shown in FIG. 12B moves to the upper right.

The headlamp light-projecting device 26 uses a headlamp to project in the forward direction of the host vehicle the total projection pattern in accordance with the control by the control section 24. The total projection pattern includes the moving projection pattern.

The headlamp light-projecting device 26 has a built-in low beam unit and high beam unit, for example, and each of these units is configured by a halogen lamp or an LED lamp. The high beam unit of the headlamp light-projecting device 26 can project an arbitrary projection pattern. For example, the high beam unit of the headlamp light-projecting device 26 projects in the forward direction of the host vehicle the total projection pattern including the moving projection pattern such as those shown in FIG. 10 to FIG. 12.

<Action of Projection System 10>

Figure 13:
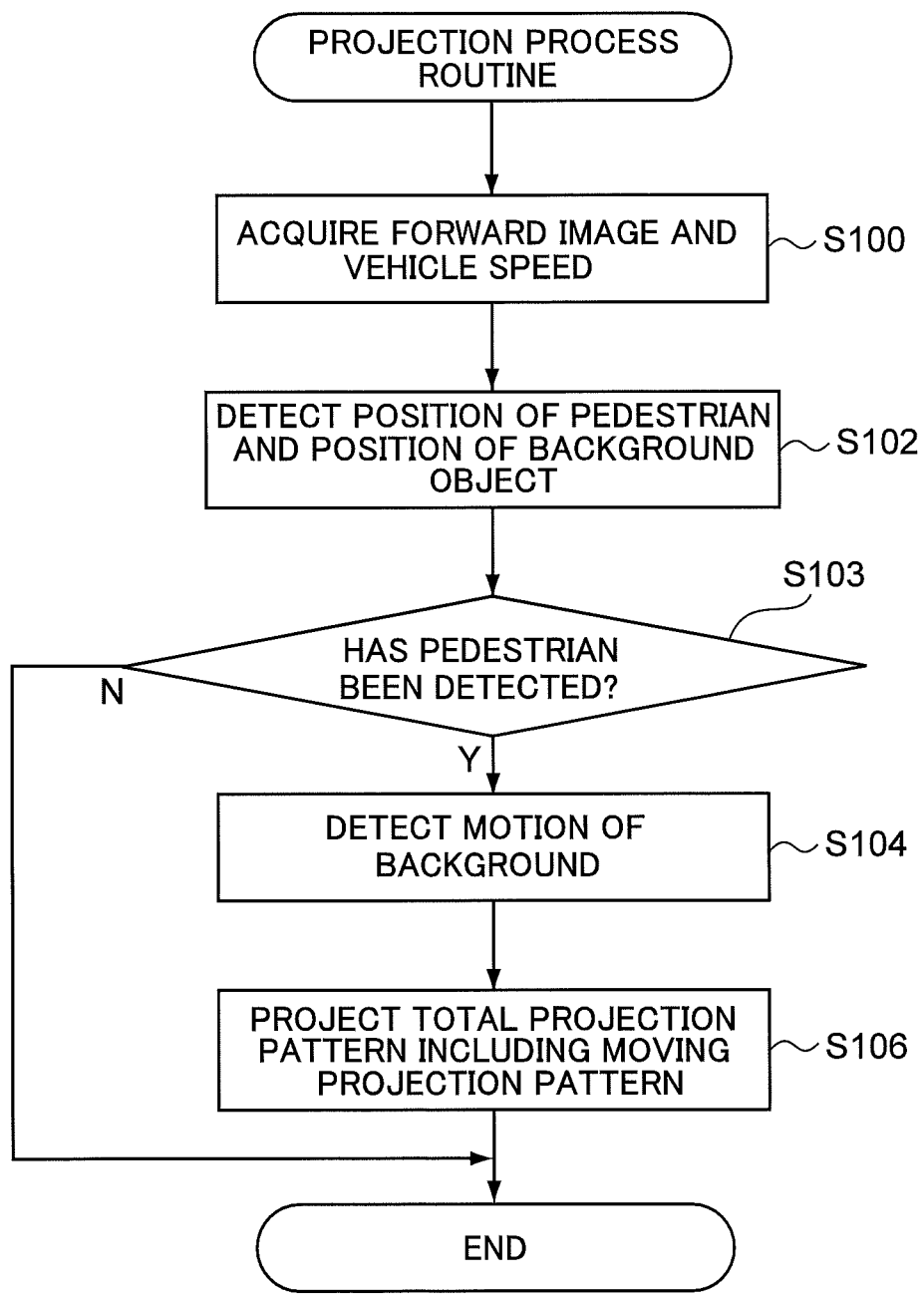
FIG. 13 is a flowchart showing a projection process routine executed by the projection system of the embodiments of the present invention.

Next, the action of the projection system 10 pertaining to the present embodiment will be described. First, as the total projection pattern not including the moving projection pattern is being projected in the forward direction of the host vehicle by the headlamp light-projecting device 26, the forward image is sequentially captured by the image capturing device 12, and when the vehicle speed of the host vehicle is sequentially detected by the vehicle speed sensor 14, the projection process routine shown in FIG. 13 is repeatedly executed in the projection system 10.

First, in step S100, the information acquiring section 18 acquires the forward image captured by the image capturing device 12 and the vehicle speed of the host vehicle detected by the vehicle speed sensor 14.

Next, in step S102, the position detecting section 20 detects the positions of a pedestrian located in front of the host vehicle and a background object located in the background of the pedestrian on the basis of the forward image acquired in step S100.

Then, in step S103, it is determined whether or not a pedestrian located in front of the host vehicle has been detected. In a case where a pedestrian located in front of the host vehicle has been detected, the projection system 10 moves to step S104. On the other hand, in a case where a pedestrian located in front of the host vehicle has not been detected, the projection process routine is ended.

Then, in step S104, the motion detecting section 22 detects the relative motion of the background object on the basis of the vehicle speed acquired in step S100 and the position of the background object detected in step S102.

In step S106, on the basis of the position of the pedestrian detected in step S102 and the relative motion of the background object detected in step S104, the control section 24 generates the total projection pattern in which the projection pattern that moves in a direction corresponding to the opposite direction of the direction of motion of the background at the position of the pedestrian is placed in correspondence to the change in the position of the pedestrian. The control section 24 controls the headlamp light-projecting device 26 so as to project the total projection pattern. Then, the control section 24 ends the projection process routine. It should be noted that the control section 24 may also generate the total projection pattern in which the projection pattern that moves in a direction corresponding to the direction of motion of the background at the position of the pedestrian is placed in correspondence to the change in the position of the pedestrian.

In a case where a pedestrian located in front of the host vehicle has been detected, the headlamp light-projecting device 26 projects in the forward direction of the host vehicle the total projection pattern including the moving projection pattern in accordance with the control by the control section 24.

As described above, according to the projection system 10 pertaining to the first embodiment of the present invention, by controlling the headlamp light-projecting device so as to project onto the position of the pedestrian the projection pattern that moves in a direction corresponding to the direction of motion of the background at the position of the pedestrian or a direction corresponding to the opposite direction of the direction of motion of the background, the driver of the vehicle can be effectively made aware of the presence of the pedestrian, so the driver of the vehicle can be alerted.

Furthermore, even in a situation where it is difficult for the driver to notice a pedestrian just by having the headlamps turned on, the awareness of the driver of the vehicle can be strongly triggered by projecting the design that moves in conjunction with the motion of the background. Furthermore, because the driver is directly alerted to the target object, the driver can be safely alerted to the pedestrian without the driver being distracted by something else.

Furthermore, at night, in a vehicle equipped with a headlamp capable of projecting an arbitrary pattern, the pattern can be projected onto a person or a barrier around the vehicle to better make the driver of the vehicle aware of the presence of that person or barrier.

Second Embodiment

Next, a second embodiment of the present invention will be described. It should be noted that the projection system 10 pertaining to the second embodiment has the same configuration as that of the first embodiment, so description thereof will be omitted.

The second embodiment differs from the first embodiment in that the motion detecting section 22 detects the relative motion of a pedestrian and, on the basis of the relative motion of the pedestrian that has been detected, the control section 24 controls the headlamp light-projecting device 26 so as to change the position of the moving projection pattern and project the moving projection pattern in correspondence to the change in the relative position of the pedestrian.

For example, in a case where, as the host vehicle is traveling, the pedestrian suddenly jumps out onto the road, it is necessary to project the moving projecting pattern in correspondence to the change in the relative position of the pedestrian. In the second embodiment, the motion detecting section 22 detects the relative motion of the pedestrian and, on the basis of the relative motion of the pedestrian that has been detected, the control section 24 controls the headlamp light-projecting device 26 so as to change the position of the moving projection pattern and project the moving projection pattern in correspondence to the change in the relative position of the pedestrian.

The motion detecting section 22 of the projection system 10 pertaining to the second embodiment calculates the relative motion of the pedestrian on the basis of a time series of the position of the pedestrian detected by the position detecting section 20.

Furthermore, on the basis of the position of the pedestrian detected by the position detecting section 20 and the relative motion of the pedestrian calculated by the motion detecting section 22, the control section 24 controls the headlamp light-projecting device 26 so as to change the position of the moving projection pattern and project the moving projection pattern in correspondence to the change in the relative position of the pedestrian.

It should be noted that other configurations and the action of the projection system 10 pertaining to the second embodiment are the same as those of the first embodiment, so description thereof will be omitted.

As described above, according to the projection system 10 of the second embodiment, by detecting the relative motion of the pedestrian and, on the basis of the relative motion of the pedestrian that has been detected, controlling the headlamp light-projecting device 26 so as to change the position of the moving projection pattern and project the moving projection pattern in correspondence to the change in the relative position of the pedestrian, the moving projection pattern can be precisely projected onto the pedestrian.

<Experimental Results>

Next, experimental results obtained by simply measuring the effect that the moving projection pattern described in the embodiments of the present invention has on the awareness of a person will be described. As the experiment, an indoor simulation experiment was conducted.

The conditions of the simulation experiment are given below.
(1) Establish a background in which travel can be foreseen.
(2) Display an alphabetical letter in the center of the screen to cause the subject to fix his/her gaze on the center.
(3) People appear from time to time; project an alert indication (a high beam equivalent, flashing, a moving design).
(4) Measure the subject's response time from the appearance of each person to until the subject clicks a mouse (the shorter the amount of time, the greater the effect).

Figure 14:
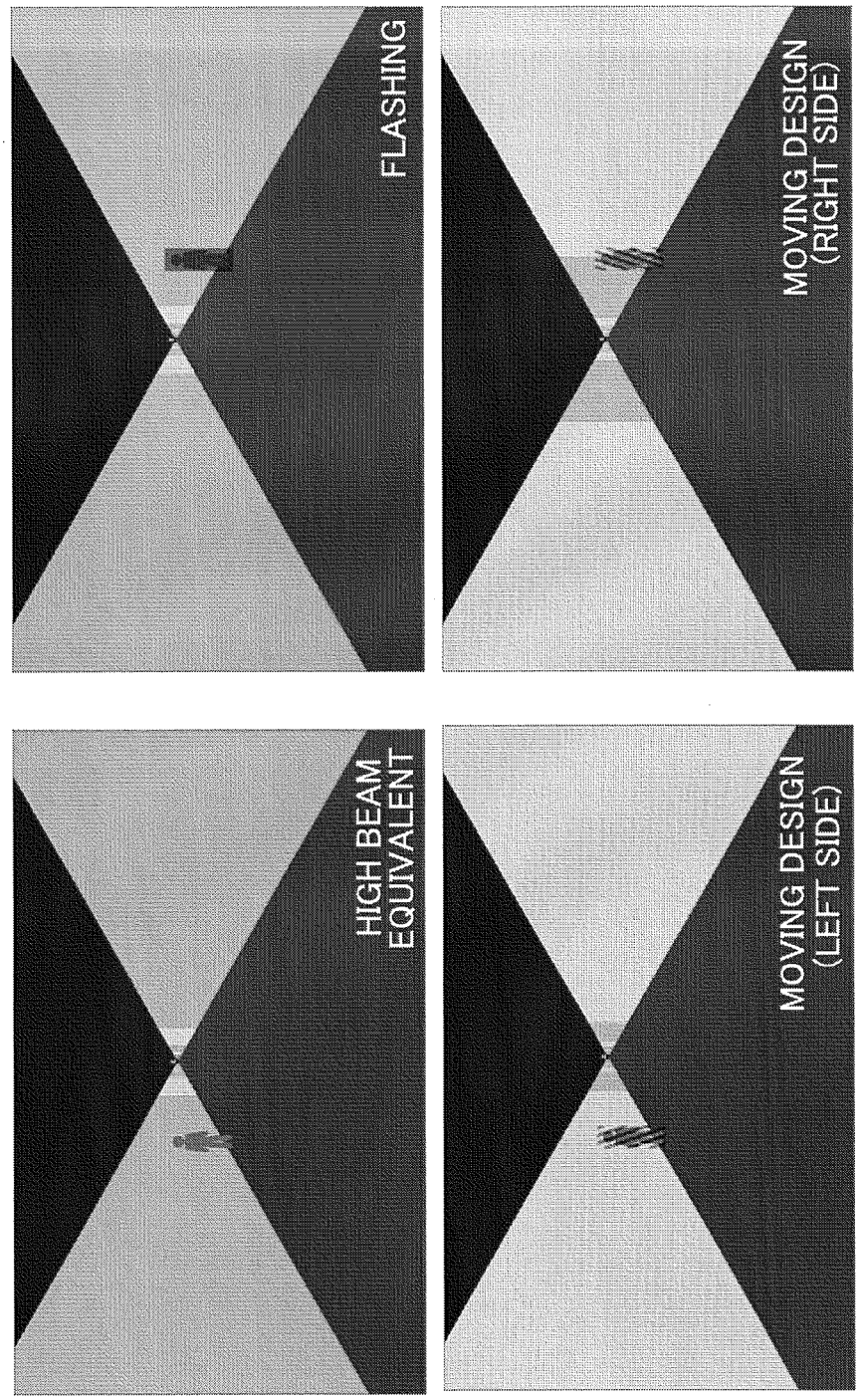
FIG. 14 is a drawing showing images used in a simulation experiment.
Figure 15:
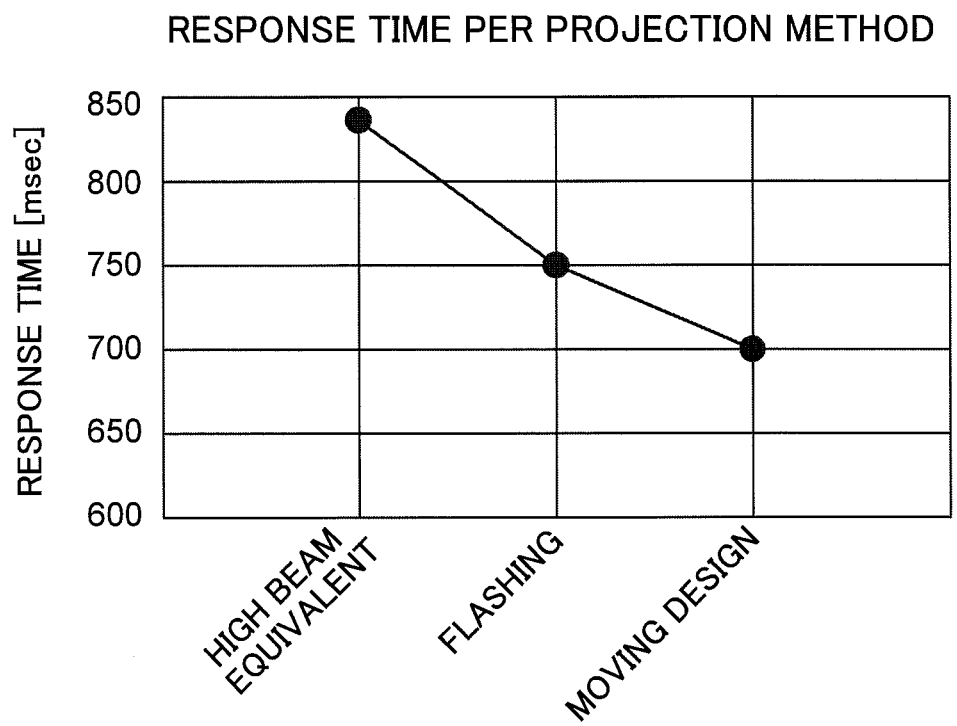
FIG. 15 is a drawing showing experimental results of the simulation experiment.

FIG. 14 shows the images that were presented to the subject in the simulation experiment. FIG. 15 shows averages of the results in which the simulation experiment according to the above conditions was performed 120 times (in which each projection pattern was projected 20 times each on the right and left sides). As shown in FIG. 15, it will be understood that the response time was shorter with the projection pattern including the moving design than with the projection of the high beam equivalent and the projection resulting from flashing.

It should be noted that the present invention is not limited to the example embodiments that have been described using the drawings and can be modified and applied in a variety of ways without departing from the spirit thereof.

For example, in the embodiments described above, a case where the position detecting section 22 detects the position of the target object and the position of the background object on the basis of the forward image captured by the image capturing device 12 was taken as an example and described, but the present invention is not limited to this and the position detecting section 22 may also detect the position of the target object and the position of the background object by another method. For example, the position detecting section 22 may also detect the position of the target object and the position of the background object from information obtained by laser radar.

Furthermore, in the embodiments described above, a case where the target object is a pedestrian was taken as an example and described, but the present invention is not limited to this and the target object may also be another object.

It should be noted that the program of the present invention can be stored in a recording medium and provided.

What is claimed is:

1. A projection system comprising:
    a position detecting section that detects a position of a target object located in front a host vehicle; and
    a control section which, based on the position of the target object detected by the position detecting section, controls a headlamp so as to project onto the position of the target object a projection pattern that moves in a direction corresponding to a direction of motion of a background at the position of the target object or a direction corresponding to an opposite direction of the direction of motion of the background.

2. The projection system according to claim 1, wherein the projection pattern is a projection pattern in which a predetermined design moves.

3. The projection system according to claim 2, wherein the predetermined design is a design predetermined in accordance with the direction of motion of the background.

4. The projection system according to claim 1, wherein in a case where the position of the target object detected by the position detecting section is on a right side of a road, control section controls the headlamp so as to project onto the position of the target object projection pattern which moves in a lower right direction or an upper left direction, and in case where the position of the target object detected by the position detecting section is on a left side of the road, the control section controls the headlamp so as to project onto the position of the target object the projection pattern which moves in a lower left direction or an upper right direction.

5. The projection system according to claim 1, wherein the control section controls the headlamp so as to change the position of the projection pattern and project the projection pattern in correspondence to a change in a relative position of the target object based on the position of the target object detected by the position detecting section and a velocity of the host vehicle.

6. The projection system according to claim 5, wherein the position detecting section further detects a position of a background object located in the background of the target object, and
    the control section calculates a relative motion of the background object based on the position of the background object detected by the position detecting section and the velocity of the host vehicle and changes the position of the projection pattern and projects the projection pattern in correspondence to the change in the relative position of the target object based on the position of the target object detected by the position detecting section and the relative motion of the background object that has been calculated.

7. The projection system according to claim 1, wherein the control section calculates a relative motion of the target object based on a time series of the position of the target object detected by the position detecting section and changes the position of the projection pattern and projects the projection pattern in correspondence to the change in a relative position of the target object based on the position of the target object detected by the position detecting section and the relative motion of the target object that has been calculated.

8. The projection system according to claim 1, wherein the target object is a pedestrian.

9. A non-transitory computer-readable storage medium storing a program for causing a computer to:
- detect a position of a target object located in front of a host vehicle; and based on the position of the detected target object, control a headlamp so as to project onto the position of the target object a projection pattern that moves in a direction corresponding to a direction of motion of a background at the position of the target object or a direction corresponding to an opposite direction of the direction of motion of the background.

* * * * *